(12) United States Patent
Heinonen et al.

(10) Patent No.: US 6,438,385 B1
(45) Date of Patent: *Aug. 20, 2002

(54) MOBILE COMMUNICATION DEVICES

(75) Inventors: Pekka Heinonen, Espoo; Jari Vainikka; Sakari Kangas, both of Vantaa; Johan Idman; Risto Lehtinen, both of Helsinki; Harri Okkonen, Espoo; Ilkka Tuomi; Kari Kurronen, both of Helsinki; Jussi Rajala, Espoo, all of (FI)

(73) Assignee: Nokia Mobile Phones Limited (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/871,679

(22) Filed: Jun. 6, 1997

(30) Foreign Application Priority Data

Jun. 17, 1996 (FI) .................................................. 962518

(51) Int. Cl.[7] .......................... H04B 15/00; H04B 1/00; H04M 1/66

(52) U.S. Cl. ......................... 455/501; 455/70; 455/411; 455/456; 455/565

(58) Field of Search ................................ 455/501, 515, 455/66, 426, 556, 383, 343, 517, 456, 431, 218, 70, 567, 457, 71, 411, 212; 379/421, 420

(56) References Cited

U.S. PATENT DOCUMENTS

| | | | |
|---|---|---|---|
| 3,909,727 A | * 9/1975 | Hughes et al. | 375/217 |
| 3,962,553 A | * 6/1976 | Linder et al. | 455/462 |
| 4,430,742 A | * 2/1984 | Milleker et al. | 375/217 |
| 4,663,765 A | * 5/1987 | Sutphin et al. | 375/217 |
| 4,882,766 A | * 11/1989 | Akaiwa | 455/512 |
| 5,109,526 A | * 4/1992 | Reed | 455/11.1 |
| 5,146,610 A | * 9/1992 | Longshore et al. | 455/35.1 |
| 5,159,593 A | * 10/1992 | D'Amico et al. | 370/332 |
| 5,173,927 A | 12/1992 | Strommer et al. | 375/81 |
| 5,224,150 A | * 6/1993 | Neustein | 455/31.1 |
| 5,237,612 A | * 8/1993 | Raith | 380/23 |
| 5,243,640 A | * 9/1993 | Hadley et al. | 455/426 |
| 5,361,294 A | * 11/1994 | Lee et al. | 455/561 |
| 5,371,901 A | * 12/1994 | Reed et al. | 455/69 |
| 5,390,341 A | * 2/1995 | Ziniel | 455/517 |
| 5,404,573 A | * 4/1995 | Yabe et al. | 455/423 |
| 5,442,805 A | * 8/1995 | Sagers et al. | 455/456 |
| 5,606,548 A | 2/1997 | Vayrynen et al. | 370/252 |
| 5,613,218 A | * 3/1997 | Li et al. | 455/71 |

(List continued on next page.)

FOREIGN PATENT DOCUMENTS

| | | | | |
|---|---|---|---|---|
| EP | 0135783 A3 | 4/1985 | | |
| EP | 0 746 131 A1 | 12/1996 | | |
| FI | 951448 | 9/1995 | | |
| GB | 2329794 | * 3/1999 | ............ H04Q/7/32 |
| WO | 98/34412 | * 8/1998 | | |

OTHER PUBLICATIONS

Patent Abstracts of Japan, JP, A, 06062108, Sanyo Electric Co., Ltd., Mar. 4, 1994.

Primary Examiner—Vivian Chin
Assistant Examiner—Charles N. Appiah
(74) Attorney, Agent, or Firm—Perman & Green, LLP

(57) ABSTRACT

A method for eliminating the disturbance caused by a mobile station (MS) situated within a certain area 1. In order to be able to prevent disturbance caused by a mobile station reliably, the mobile station (MS) is provided with control means for the muting of the mobile station as a response to a predetermined message (S1) transmitted to the mobile station, and transmitting means (BTS) are arranged in said certain area 1 for the transmitting of said predetermined message to a mobile station situated in the area 1 in order to mute the mobile station.

45 Claims, 3 Drawing Sheets

U.S. PATENT DOCUMENTS

| | | | | |
|---|---|---|---|---|
| 5,623,268 A | * | 4/1997 | Haan | 342/32 |
| 5,737,707 A | * | 4/1998 | Gaulke et al. | 455/556 |
| 5,774,787 A | * | 6/1998 | Leopold et al. | 455/12.1 |
| 5,815,407 A | * | 9/1998 | Huffman et al. | 702/57 |
| 5,832,386 A | * | 11/1998 | Nojima et al. | 455/465 |
| 5,940,764 A | * | 8/1999 | Mikami | 455/456 |
| 5,991,614 A | * | 11/1999 | Oura | 455/404 |
| 6,011,973 A | * | 1/2000 | Valentine et al. | 455/456 |
| 6,052,577 A | * | 4/2000 | Taguchi | 455/411 |
| 6,085,096 A | * | 7/2000 | Nakamura | 455/456 |

* cited by examiner

MOBILE COMMUNICATION DEVICES

BACKGROUND OF THE INVENTION

The present invention relates to mobile communication devices and to cellular radio systems comprising at least a mobile telephone center, mobile stations, and a base station which comprises means for establishing a connection to mobile stations situated in its coverage area using radio frequency signals, and telecommunication means for transferring telecommunication signals between the mobile telephone center and the mobile stations. The invention also relates to a radio system base station comprising transmitting means for transmitting radio signals to a mobile station situated within its coverage area and telecommunication means for establishing a telecommunication connection to the mobile telephone center of the system. The invention also relates to a cellular radio system mobile station comprising transmitting means for transmitting radio signals to a base station serving a first radio cell and reception means for receiving radio signals from said base station serving the first radio cell, wherein the reception means comprise means for monitoring a general transmission channel used in said first radio cell for the reception of information transferred by it.

Mobile stations often cause unwanted disturbance in their surroundings. This disturbance can in general be divided into two categories:

interference to electronic devices caused by a mobile station (EMC interference). Such interference is extremely harmful, e.g. in hospitals, airplanes or similar areas, and disturbance caused to other persons by the ringing tone of a mobile station in public domains or during public occasions (churches, meetings etc.).

The concept referred to below as 'muting' means, in the present context, that a mobile station is controlled such that it no longer presents a disturbance, or presents a reduced level of disturbance, in its surroundings.

In the prior known mobile communication systems it has not been possible to automatically prevent the occurrence of the disturbances described above. Rather, this responsibility has been left to the user of a mobile station who must remember to turn off his mobile station and/or to adjust its alarm tune to a lower level in order to avoid disturbance. In practice, it has been found that the users of mobile stations do not always remember to turn off their mobile stations or to adjust their buzzers to a lower level.

SUMMARY OF THE INVENTION

It is an object of the present invention to overcome or at least mitigate the above described problem and to provide a method for eliminating or reducing the disturbance caused by a mobile station situated in a certain area. This object is achieved by the use of the method according to the invention, characterized in that a mobile station is provided with control means for muting the mobile station in response to a predetermined message transmitted to the mobile station, and transmitting means is arranged in said certain area for transmitting said predetermined message to the mobile station situated in the area in order to mute According to a first aspect of the present invention there is provided a method of operating a mobile station in an RF telephone network in order to reduce or eliminate disturbance by the phone in a local area of the network whilst allowing the phone to function normally elsewhere in the network, the method comprising:

broadcasting a predefined message across said local area from a base station located within the local area;

detecting the broadcast message at the mobile station when the mobile station enters or otherwise becomes active in the local area; and in response to detection of the broadcast message, muting the mobile station.

Embodiments of the invention make use of the concept that, when a radio transmitter is arranged in an area where it is important to prevent disturbance and where the transmitter has been arranged to transmit a muting message to all mobile stations arriving in its coverage area, it can be ensured that in said area mobile stations will not cause disturbance even if their users should forget to turn off or mute the alarm tune in their mobile stations on arrival in the area. Case by case, using a muting message, a maximum transmitting output allowed or alternatively a maximum volume for the alarm tune can be signaled to a mobile station. The most significant advantage of this method is accordingly that the disturbance from mobile stations within a certain area can be prevented securely, reliably and automatically, or in other words, without requiring any action by the user of a mobile station.

According to another aspect of the present invention, there is provided a cellular radio system which comprises at least one mobile station comprising control means for muting it in response to a predetermined muting message received by radio communication, and at least one base station comprising means for transmitting said muting message to a mobile station situated within its coverage area.

When an area, in which disturbances caused by mobile stations are wanted to be prevented, is provided with an individual radio cell and a base station serving it, the mobile stations arriving in the area can be forced to monitor the general transmission channel of the cell concerned, over which channel a muting message is transmitted to them. If required, it is possible to force mobile stations situated within the area to lock on to the radio cell in question.

When a base station in a preferred embodiment of the system comprises means for announcing a highest allowed transmitting output to a mobile station using a muting message, and the control means of the mobile station have been arranged to adjust the transmitting output of the transmitter of the mobile station in response to the information comprised in the muting message, it can be ensured that even call attempts made by the user of the mobile station will not cause disturbance. In other words, the transmitting output can be ordered to such a low level (even down to zero) that it will not cause interference to electrical equipment in the environment.

In another preferable embodiment of the system according to the invention, the system (e.g. a mobile communication center) prevents, using a muting message, the connecting of a call directed to a muted mobile station and instead transmits a message advising of the blocked call to the mobile station. The message can in such a case comprise for example an A-subscriber code, allowing the user to find out who has tried to call him. This embodiment naturally requires that a message has been transferred to the mobile communication center informing that the mobile station in question has been muted using a muting message.

According to another aspect of the present invention there is provided a base station which comprises means for transmitting by radio a predetermined muting message to a mobile station situated within its radio coverage area.

In a preferred embodiment of such a base station, the base station comprises monitoring means for the monitoring of predetermined frequency channels, in which case the frequency channels to be monitored include in addition to the frequency channels used by the base station itself, also the frequency channels of adjacent base stations, for example those of the base station of another operator and/or frequency channels used by another radio system. When the base station detects a mobile station transmitting radio signals on a frequency channel, it transmits a muting signal to the mobile station in question, preferably using the BCCH-channel used by the radio system in question. This embodiment facilitates that disturbances within a certain area can be prevented using one base station, instead of needing several base stations in the area concerned. In other words, the base station arranged in the area is adapted to monitor the frequency channels used by, e.g. GSM-, DCS 1800- and DCS 1900-systems, for the detecting and muting of active mobile stations. The application of this embodiment requires that a detected mobile station is capable of receiving signals transmitted on a BCCH-channel used by the system even when it is on a traffic channel, or when the mobile station is making a call.

According to a further aspect of the invention, there is provided a mobile station which comprises control means responding to reception means for muting the mobile station in response to a predetermined muting message. In a preferred embodiment of a mobile station according to the invention, the mobile station comprises means for monitoring signals transmitted by at least two base stations on a general transmitting channel and detecting means for the detection of said muting message on any of said general transmitting channels. In this case, e.g. two base stations with overlapping coverage areas or two different cellular radio systems, it can be ensured that the mobile stations of both systems are muted.

Preferred embodiments of the method, the cellular radio system, the base station and the mobile station according to the invention are characterized in the dependent claims 3 to 6, 8 to 9 and 11 to 14 below.

BRIEF DESCRIPTION OF THE DRAWINGS

For a better understanding of the present invention and in order to show how the same may be carried into effect reference will now be made, by way of example, to the accompanying drawings, in which.

DESCRIPTION OF THE PREFERRED EMBODIMENTS

Figure 1:
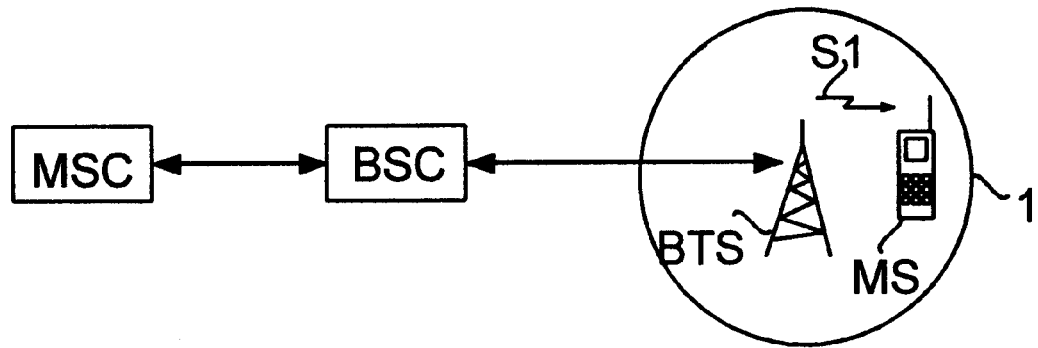
FIG. 1 presents a block diagram of a first preferable embodiment of a system according to the invention.

FIG. 1 presents a block diagram of a first preferred embodiment of a system according to the invention. FIG. 1 presents a part of a cellular radio system, for example a part of a GSM-system, comprising a mobile communication center MSC, a base station controller BSC, and a base station BTS.

In the example of FIG. 1, it is desired to prevent interference caused by mobile stations MS within area 1. Area 1 may comprise for example one or more wards in a hospital or the cabin of an airplane, where it is important to ensure that signals transmitted by mobile stations will not disturb electrical equipment in their surroundings (EMC-protection). Alternatively, area 1 may consist of a conference room or a church, in which case it is desired to make sure that the alarm tune of a mobile station within the area will not disturb the surroundings (noise inconvenience).

Area 1 is provided with a base station BTS, the radio coverage area of which substantially matches area 1. The base station BTS may be a base station capable of only transmitting on the general transmission channel BCCH of the GSM-system or it may alternatively be a complete GSM base station, via which calls may be transferred if necessary. The radius of the coverage area of base station BTS may be several kilometers or alternatively may be only a few meters (pico-cell/nano-cell). The mobile station MS may be a completely conventional GSM-system mobile station, in which the properties required for muting the mobile station have been arranged through the software, either in the memory of the mobile station or in the memory of its SIM (Subscriber Identity Module)-board.

In FIG. 1, mobile station MS receives by radio from base station BTS a muting message S1, by means of which the base station mutes the mobile station. The muting message may comprise for example the following parameters:

1. Maximum allowed transmitting output (e.g. 250 mW). If the value=0 mW, the mobile station must not transmit any signals at all.

2. RSSI limit value for maximum transmitting output (Received Signal Strength Indication). If the level of the signals received from the base station exceeds said limit-value, the maximum transmitting output of the mobile station is that defined by the muting message. If, however, the reception level is below said limit-value, the mobile station must perform a scaling operation to determine the maximum transmitting output which it can use, based upon the transmitting output given in the muting message, the normal base station maximum transmitting output, and certain scaling parameters.

3. Scaling parameters for maximum transmitting output.

4. A silent-alarm parameter defined as TRUE or FALSE. At value TRUE, the mobile station must not use an audible alarm tune. At value FALSE, the mobile station will ring according to the settings selected by the user.

5. RSSI limit-value for alarm tune. If the RSSI-value of the level of the signals received from the base station exceeds this value, the mobile station must obey the silent-alarm parameter. If the RSSI-value is not exceeded, the mobile station may ring according to the settings selected by the user.

6. A compulsory location updating-parameter (in IMSI Detach GSM-system). At value TRUE, the mobile station must carry out a location updating to the network to inform the network that it can no longer be reached (the same operation as when a mobile station is no longer turned on). In this case any arriving calls are directed to an answering machine if the subscriber is using an answering service.

7. RSSI limit values for the compulsory location updating. There are preferably two of said limit values, or different values for DETACH and ATTACH-procedures, in order to prevent alternating detach-attach jumping.

Base station BTS can transmit a muting message to mobile station MS using either a separately defined frequency channel, which the mobile station MS has been arranged to monitor, or alternatively base station BTS can transmit the muting message over its general transmission channel, or BCCH-channel, which is at all times monitored by the mobile station MS. In the GSM-system, base stations transmit on the BCCH-channel inter alia information concerning the cell (e.g. access-parameters). When a mobile station is turned on, it starts to check on the GSM-frequencies in order to find base station BCCH-channels. Out of the detected channels mobile station MS selects the best one. In this way, the transmitting of a muting message on a general transmission channel has the advantage that a mobile station, on arrival in a cell or when it is turned on, will certainly receive the muting message before the mobile station starts to transmit signals.

If in the muting message a maximum allowed transmitting output power higher than 0 has been defined, and a mobile station must inform the network that it no longer can be reached (IMSI Detach), the mobile station preferably transmits a predefined message which informs the mobile communication center that the mobile station can no longer can be reached because it has been muted using a muting message. In this way the mobile communication center is capable of maintaining a register of muted mobile stations. If meantime it is attempted to direct a call to one of the muted mobile stations, the mobile communication center can memorize the A-subscriber ID of the failed call and transfer it later to the mobile station, when the mobile station is no longer muted.

Figure 2:
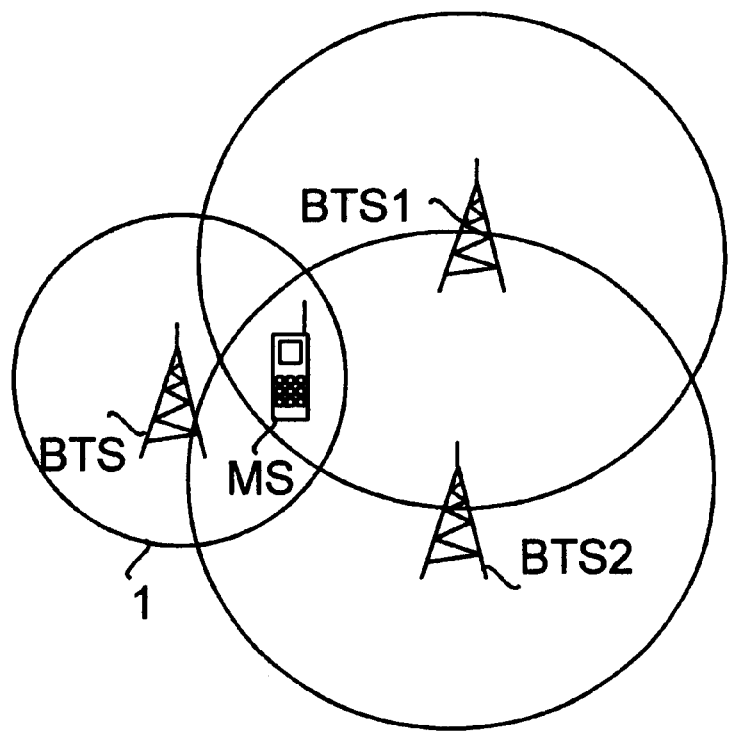
FIG. 2 illustrates the coverage areas of radio cells of the system presented in FIG. 1.

FIG. 2 illustrates the coverage areas of the radio cells of the system presented in FIG. 1. As FIG. 2 shows, the coverage areas of base stations BTS1, BTS2 and BTS are overlapping, and accordingly mobile station MS situated in area 1 receives the signals (BCCH-channels) from all three base stations. In order that a mobile station within Area 1 would not cause disturbance by attempting a connection through a base station other than base station BTS arranged in Area 1, different priorities have been defined for the base stations presented in FIG. 1. Of the base stations presented in FIG. 1, the highest priority has been allocated to base station BTS. Mobile station MS in turn has been arranged to lock on to the base station having the highest priority, based upon the signal strength of the BCCH-channel received from the base station (compare with parameter 7 explained in connection with FIG. 1), in which case base station BTS transmits to it a muting message at the latest in connection with said channel change.

In practice a mobile station need not always lock on to the base station having the highest priority when it detects one, but on some occasions it is sufficient that the mobile station just obeys the information (such as a muting message) transferred to it from a base station having the highest priority when it detects one.

The priorities of base stations can be transferred to a mobile station using several optional methods, for example in such a way that:

each base station transmits on its general transmission channel the information about its priority, or the information about which frequency or which frequencies are highest in each country has been saved in mobile station MS or in the SIM-board of it. In such a case a mobile station can identify the base station having the highest priority based upon the frequency channel used by it. Preferably in each country the same frequency channels should be used in base stations having a high priority.

Figure 3:
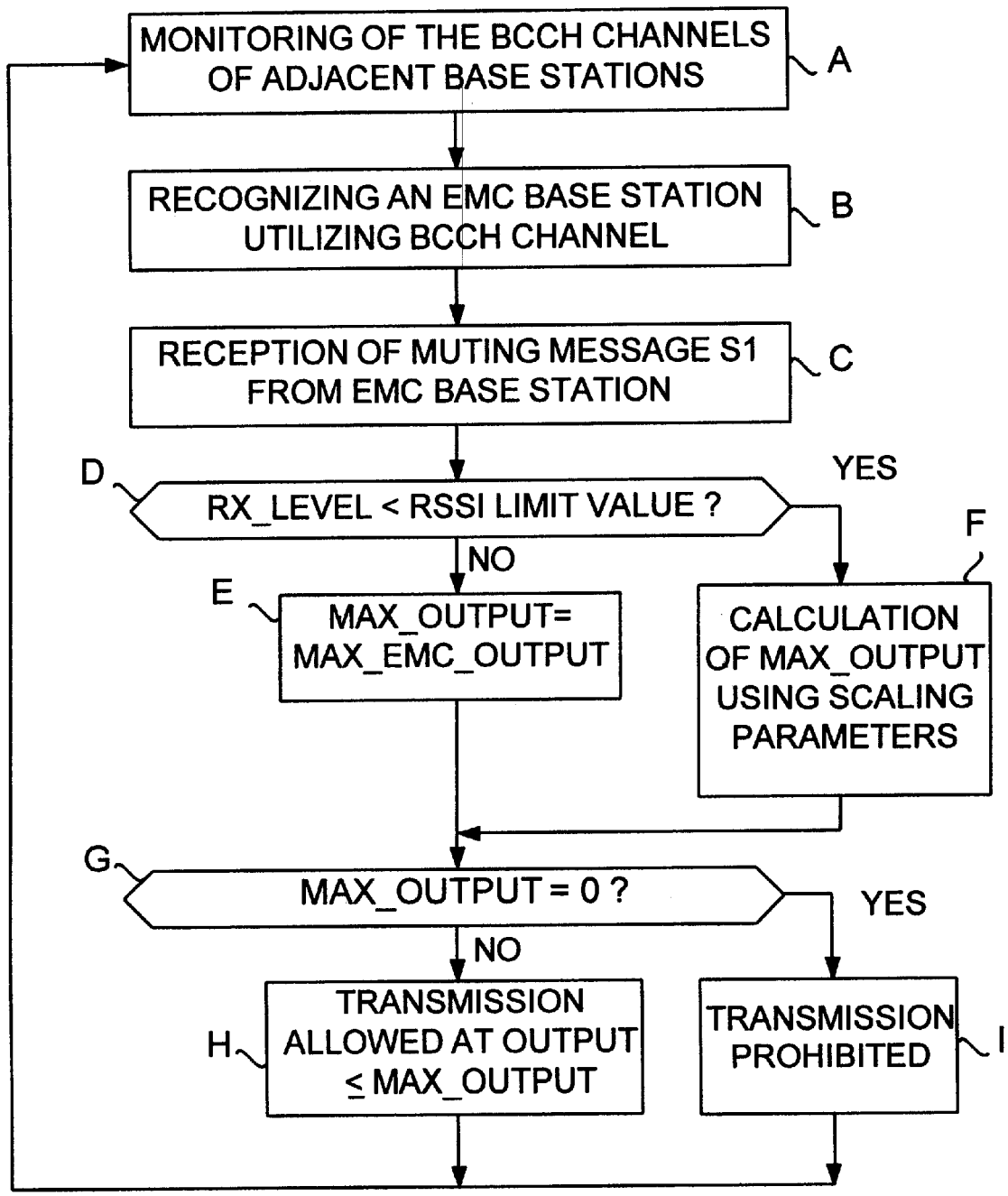
FIG. 3 is a flow diagram illustrating the determination of the maximum output of a mobile station.

FIG. 3 is a flow diagram illustrating the determination of the maximum output power of a mobile station. In FIG. 3, it has been assumed that an EMC-base station, or a base station which has been arranged in the area in which it is desired to prevent disturbance caused by mobile stations, continuously transmits a muting message on its BCCH-channel. In addition, the base station transmits the BCCH-channel on a frequency channel which indicates to the mobile station that a base station having the highest priority is concerned.

As is shown in block A, a mobile station monitors, in addition to the BCCH-channel of its own base station, also the BCCH-channels of the adjacent cells.

As is shown in block B, a mobile station recognizes an EMC-base station based upon the BCCH-frequency channel which the latter uses, in which case the mobile station (which is presumed to be within the area to be protected from interference) responds to the information transmitted by the EMC-base station on the BCCH-channel by locking on to the radio cell of said base station.

As shown in block C (or already in block B straight after the detecting of the EMC-base station), the mobile station receives a muting message S1 from the EMC-base station on the BCCH-channel of the latter. The contents of a muting message have already been described in detail in connection with FIG. 1.

In block D, the mobile station compares the signal strength $RX_{13}$ LEVEL, measured in connection with the reception of the muting message, with the RSSI-limit value conveyed in the muting message. If the RSSI-limit value is not exceeded, a transfer to block F takes place. If on the other hand the RSSI-limit value is exceeded, a transfer to block E takes place.

In block E the mobile station adjusts its maximum transmitting output $MAX_{13}$ OUTPUT to correspond with the allowed transmitting output $MAX_{13}$ $EMC_{13}$ OUTPUT conveyed in the muting message.

In block F, the maximum transmitting output $MAX_{13}$ OUTPUT of the mobile station is calculated based upon the scaling parameters conveyed in the muting message in such a way that the maximum transmitting output of the mobile station is set between the maximum transmitting output $MAX_{13}$ $EMC_{13}$ OUTPUT conveyed in the muting message and the highest possible transmitting output of the mobile station.

If the user of a mobile station which has received a muting message attempts to use his mobile station, for example to make a call or to transmit a short-message, block G initially determines whether the maximum allowed transmitting output for the mobile station has been determined as $MAX_{13}$ OUTPUT=0 W. If this is the case, the mobile station cannot transmit, in which case a transfer to block I takes place. If, on the contrary, it is found out that $MAX_{13}$ OUTPUT>0 W, transmission is allowed, but only at a transmitting output power which is lower than or equal to the determined $MAX_{13}$ OUTPUT, transfer to block H takes place.

Figure 4:
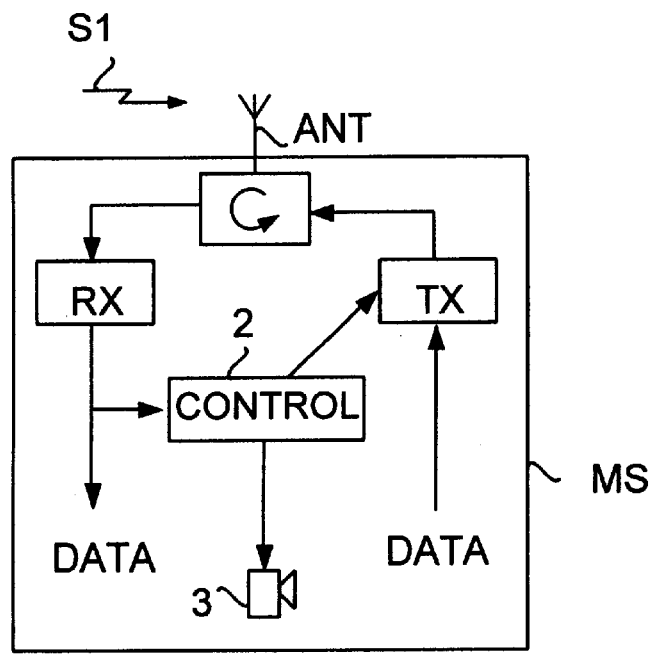
FIG. 4 is a block diagram of one embodiment of a mobile station according to the invention.

FIG. 4 is a block diagram of an embodiment of a mobile station according to the invention. The mobile station MS in FIG. 4 is generally a conventional GSM-mobile station, but has control means 2 arranged in it for detecting a muting message S1 and for processing the information conveyed by that message. In other words, when the mobile station MS has received, through its receiver RX, a muting message S1, the control means 2 mutes the mobile station based upon the information conveyed in the muting message. The control unit 2 further receives from receiver RX the information on the signal measuring results (RSSI) obtained in connection with the reception of the muting message. Based upon the information in the muting message and upon the RSSI— measuring results control unit 2 adjusts the sound level of alarm device 3 of the mobile station to an appropriate level and/or adjusts the transmitting output of transmitter TX of the mobile station to an appropriate level. Control unit 2 can be realized for example by implementing a computer program in the software of the prior known mobile station.

If desired, it is possible to add in the mobile station in FIG. 4 a second receiver unit for the reception of a muting message to be transferred on a predetermined frequency (for example agreed individually for each country/ internationally). In this case a mobile station can easily and reliably receive a muting message on some frequency channel, other than a frequency channel utilized by its own cellular radio system.

Figure 5:
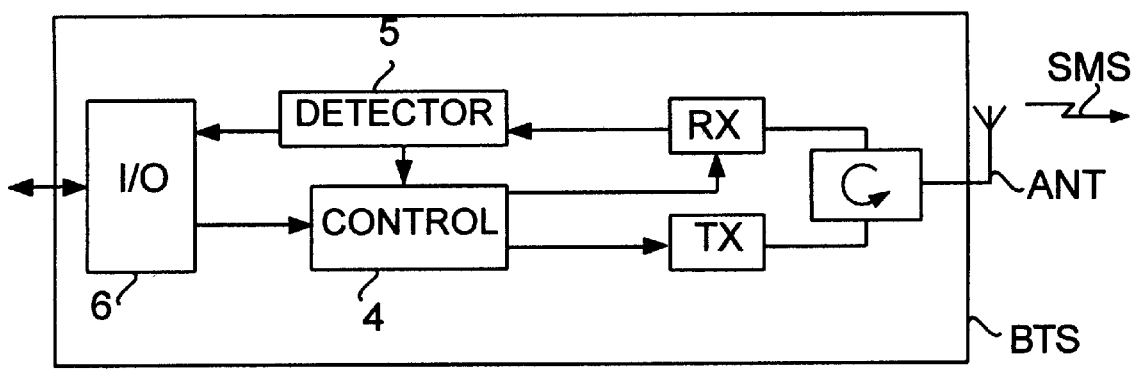
FIG. 5 is the block diagram of one embodiment of a base station according to the invention.

FIG. 5 presents a block diagram of an embodiment of a base station according to the invention. In the base station in FIG. 5 one transmitter TX and one receiver RX have been presented, but the base station can have other transmitters and receivers. Base station BTS is connected to the mobile communication center of the system through its I/O-unit 6.

Base station BTS has been adapted to transmit continuously on its general transmission channel, or BCCH-channel, a muting message to mobile stations situated in its coverage area, using its transmitter TX and antenna ANT. In this case the base station utilizes a frequency channel which directly indicates to a mobile station receiving its general transmission channel that a high priority base station is concerned.

In FIG. 5, control unit 4 has been arranged in connection with base station BTS, which control unit can be realized for example using a computer program. The control unit in question comprises means for controlling receiver RX of the base station in such a way that the receiver receives signals from frequency channels other than just the frequency channels used by the cellular radio system concerned. Accordingly the control unit can reserve from receiver RX, for example, one time slot during which it controls the receiver in such a way that the receiver scans, or checks one by one, all GSM- and/or DCS-1800 mobile telephone system frequency channels. Detector 5 monitors the signals obtained from the output of receiver RX. If traffic is detected on any of the frequency channels, or if in the coverage area of base station BTS a mobile station of a DCS-1800 system (or a mobile station of another GSM-operator) is detected to be transmitting signals, detector 5 detects this, after which control unit 4 allocates one of the base station time slots to the concerned BCCH-channel used by DCS-1800 system for the transmission of a muting message to the detected mobile station of the DCS-1800 system. In order to enable a base station to scan the frequency channels of two different radio systems, it may be required that the base station has a separate transmitter and receiver for each radio system. In this case the control unit of the base station controls, instead of one transmitter and receiver, several transmitters and receivers. The entire capacity of said additional receivers, or all time slots, can in this case be reserved just for the scanning of the frequency channels in the way described above.

Correspondingly, control unit 4 can control receiver RX to scan also for example the frequency channels used by DCS-1900 system in order to detect any traffic and to mute the detected mobile stations using a muting message. In this way base station BTS is capable of muting mobile stations other than its operator's "own" mobile stations.

A mobile communication center of the system further comprises means for blocking the connecting of a call directed to a certain muted mobile station and for transferring to the mobile telephone an SMS message comprising information about the blocked call directed to it. In this case base station BTS transmits to the mobile telephone a message comprising the A-subscriber ID connected to the call. The message in question can be transmitted for example as a GSM-system broadcasting message, which is not acknowledged by the mobile station. In this way the user of the mobile station receives the information about who has attempted to call him.

Alternatively the mobile communication center may memorize the A-subscriber ID of the call directed to the mobile station (or the A-subscriber IDs, if there has been several calls) until information is transferred to the mobile communication center that the mobile station concerned is connected to the network in the normal way, or that it no longer is muted. Now the memorized A-subscriber IDs can be transferred to the mobile station as a short-message.

It is apparent that the explanation given above and the figures connected with it have only been intended to illustrate the present invention. Accordingly, the solution according to the invention can be applied also for example in analogue mobile communication systems such as NMT-systems or for example in spread spectrum- mobile communication systems such as CDMA-systems.

Other variants and modifications will be self evident to a person skilled in the art without deviating from the scope of the present invention.

We claim:

1. A method of operating a mobile station in an RF-telephone network in order to reduce or eliminate disturbance by the mobile station in a local area of the network whilst allowing the mobile station to function normally elsewhere in the network, the method comprising the steps of:

broadcasting a predefined message across said local area from a base station located within the local area on a frequency channel other than a frequency channel utilized by the RF-telephone network;

detecting the broadcast predefined message at the mobile station when the mobile station enters or otherwise becomes active in the local area; and in response to detection of the broadcast predefined message, muting the mobile station.

2. A method according to claim 1, wherein the mobile station is provided with an alarm device, and the volume of the alarm device is reduced to a predetermined level in response to information in the broadcast predefined message.

3. A method according to claim 1, further comprising the steps of, when the mobile station is muted, preventing the connection of a telephone call directed to the mobile station, and transmitting a message informing about a telephone call directed to the mobile station.

4. A method according to claim 1, further comprising the steps of:

monitoring, at the mobile station, signals transmitted on general transmission channels by at least two separate base stations; and detecting said broadcast predefined message on any of said general transmission channels from any base station.

5. A method according to claim 1, further comprising the steps of:

using a first and a second base station to serve between them radio cells belonging to different cellular radio systems and to transmit on general transmission channels, and receiving, at the mobile station, on the general transmission channels of two different cellular radio systems.

6. A method according to claim 1, further comprising the steps of:

providing a plurality of base stations, detecting, at the mobile station, signals from a number of said plurality of base stations and determining the base station among the number detected having the highest priority based upon the signals received from the base stations, and responding to the detecting and determining by locking on the channel used by said base station having the highest priority.

7. A method according to claim 1, further comprising the steps of providing the base station with a general transmission channel, and broadcasting said predefined message simultaneously to several mobile stations situated within the coverage area of the base station utilizing the general transmission channel.

8. A method for eliminating the disturbance caused by a mobile station situated within a certain area and receiving telecommunications signals transferred thereto from a cellular radio system, comprising the steps of:

providing the mobile station with control means for muting the mobile station in response to a predetermined muting message transmitted to the mobile station;

arranging a transmitting station in said certain area for the transmitting of said predetermined muting message to the mobile station situated within the certain area in order to mute the mobile station; and using the transmitting station to transmit the predetermined muting message on a frequency channel other than a frequency channel used by the cellular radio system for transferring the telecommunication signals to said mobile station.

9. A method according to claim 8, wherein the mobile station is provided with an alarm device, and the volume of the alarm device is reduced to a predetermined level in response to information in the predetermined muting message.

10. A method according to claim 8, further comprising the steps of, when a mobile station is muted, preventing the connection of a call directed to the mobile station, and transmitting a message informing about a call directed to the mobile station.

11. A method according to claim 8, further comprising the steps of:

monitoring, at the mobile station, signals transmitted on general transmission channels by at least two separate transmitting stations; and detecting said predetermined message on any of said general transmission channels from any transmitting station.

12. A method according to claim 8, further comprising the steps of:

using a first and a second transmitting station to serve between them radio cells belonging to different cellular radio systems and to transmit on general transmission channels, and receiving, at the mobile station, on the general transmission channels of two different cellular radio systems.

13. A method according to claim 8, further comprising the steps of:

providing a plurality of transmitting stations, detecting, at the mobile station, the transmitting station having the highest priority based upon the signals received from the transmitting stations, and responding to the detecting by locking on the channel used by the transmitting station having the highest priority.

14. A cellular radio system comprising:

a mobile communication center;

mobile stations; and a base station comprising at least means for establishing a connection with mobile stations situated within its coverage area using radio frequency signals, and telecommunication means for transferring telecommunication signals between the mobile communication center and the mobile stations, wherein the cellular radio system further comprises:

at least one mobile station comprising control means for muting said one mobile station as a response to a predetermined muting message received by radio; and transmitting means for transmitting said predetermined muting message to said one mobile station when situated within the coverage area on a frequency channel other than a frequency channel used by the cellular radio system for transferring the telecommunication signals.

15. A cellular radio system according to claim 14, further comprising blocking means for preventing the connection of a call directed to a mobile station muted by using the muting message and for transmitting a message informing about a call directed to the mobile station.

16. A cellular radio system station according to claim 14, having a general transmission channel, and wherein the base station comprises means for transmitting said predetermined muting message simultaneously to several mobile stations situated within the coverage area of the base station utilizing the general transmission channel of the system.

17. A cellular radio system according to claim 14, wherein the mobile stations further comprise:

means for monitoring signals transmitted on general transmission channels by at least two separate base stations in the cellular radio system; and detecting means for detecting said predetermined muting message on said general transmission channels from any of said separate base stations.

18. A cellular radio system according to claim 14, wherein a first and a second base station serve between them radio cells belonging to different cellular radio systems and transmit on general transmission channels, and wherein the mobile stations comprise means for receiving the predetermined muting message on the general transmission channels of different cellular radio systems from said first and second base stations.

19. A cellular radio system according claim 14, further comprising a plurality of base stations and wherein the mobile stations comprise:

detecting means for the recognition of the base station having the highest priority based upon the signals received from the base stations, and means, responding to the detecting means, for locking on the channel used by said base station having the highest priority.

20. A cellular radio system according claim 14, wherein the mobile stations comprise:
- an alarm device, and
- means for reducing the volume of the alarm device to a predetermined level in response to information in the predetermined muting message.

21. A radio system base station, which radio system has a telecommunication center, a general transmission channel, and mobile stations, said base station comprising:
- transmitting means for transmitting radio signals to a mobile station situated within its coverage area; and
- telecommunication means for establishing a telecommunication connection to the telecommunication center of the system for transferring telecommunications signals on a frequency channel, and
- means for transmitting a predetermined muting message by radio to a mobile station situated within said coverage area on a frequency channel other than a frequency channel utilized by the radio system.

22. A radio system base station according to claim 21, further comprising blocking means for preventing the connection of a call directed to a mobile station muted by using the predetermined muting message and for transmitting a message informing about a call directed to the mobile station.

23. A radio system base station according to claim 21, further comprising means for transmitting said predetermined muting message simultaneously to several mobile stations situated within the coverage area of the base station utilizing the general transmission channel of the system.

24. A mobile station of a cellular radio system comprising:
- transmitting means for transmitting radio signals; and
- receiving means for receiving radio signals including telecommunications signals;
- adjusting means responsive to the receiving means for the muting of the mobile station in response to a predetermined muting message received by radio; and
- means for causing the receiving means of the mobile station to receive the predetermined muting message on a frequency channel other than a frequency channel used by the cellular radio system for the telecommunications signals.

25. A mobile station according to claim 24, further comprising an alarm device, and means for reducing the volume of the alarm device to a predetermined level in response to information in the predetermined muting message.

26. A mobile station according to claim 24, further comprising:
- means for monitoring signals transmitted on general transmission channels by at least two separate base stations in the cellular radio system; and
- detecting means for detecting said predetermined muting message on said general transmission channels from any of said separate base stations.

27. A mobile station according to claim 24, further comprising detecting means for recognizing the base station in the cellular radio system having the highest priority based upon the signals received from the base stations in the system, and wherein said receiving means comprises means, responding to the detecting means, for locking on the channel used by the base station having the highest priority.

28. A mobile station according to claim 24, wherein a first and a second base station serve between them radio cells belonging to different cellular radio systems and transmit on general transmission channels, and wherein the receiving means of the mobile station comprise means for receiving on the general transmission channels of two different cellular radio systems.

29. A cellular radio system comprising:
- a mobile communication center;
- mobile stations; and
- a base station comprising at least means for establishing a connection with mobile stations situated within its coverage area using radio frequency signals, and telecommunication means for transferring telecommunication signals between the mobile communication center and the mobile stations, wherein the cellular radio system further comprises:
- at least one mobile station comprising:
  - a transmitter for producing a transmitting output;
  - control means for muting the mobile station as a response to a predetermined muting message received by radio; and
  - means for adapting said control means to mute the mobile station by adjusting the transmitting output of the transmitter as a response to the information comprised in the muting message; and
- at least one base station comprising:
  - means for transmitting said muting message to said one mobile station when situated within its coverage area in order to reduce or eliminate disturbance by that mobile station whilst allowing other mobile stations to function normally; and
  - means for informing said one mobile station about a maximum allowed transmitting output using the muting message.

30. A system according to claim 29, wherein the control means comprises means to prevent the operation of the transmitter of the mobile station in response to the information comprised in the muting message.

31. A system according to claim 29, wherein the mobile station further comprises an alarm device, the control means are adapted to reduce the volume of the alarm device of the mobile station to a predetermined level in response to the information comprised in the muting message.

32. A system according to claim 29, wherein the system comprises blocking means for preventing the connection of a call directed to a mobile station muted by using the muting message and for transmitting a message informing about a call directed to the mobile station.

33. A system according to claim 29 wherein the mobile station comprises a first receiver unit for receiving telecommunications signals and a second receiver for receiving the muting message.

34. A system according to claim 29 wherein the mobile station is capable of receiving the muting message on a frequency channel other than that used by the cellular radio system for telecommunications signals.

35. A system according to claim 29 wherein the base station which transmits the muting message covers a picocell.

36. A system according to claim 29 wherein the muting message causes muting of all mobile stations within the coverage area of the base station which transmits the muting message.

37. A base station for a radio system, comprising:
- transmitting means, using selected frequency channels including a general transmission channel, for transmitting radio signals to mobile stations, having respective mobile terminals, situated within the coverage area of said base station;

means for transmitting a predetermined muting message by radio to a mobile station situated within the coverage area of said base station to prevent a user of the mobile station from communicating via the mobile terminal whilst it is muted;

monitoring means for monitoring predetermined frequency channels including the selected frequency channels used by the base station and at least one of frequency channels used by adjacent base stations and frequency channels used by another radio system; and means, responsive to the monitoring means, for causing said means for transmitting to transmit a predetermined muting message in response to the detection of a mobile station transmitting radio signals on a monitored frequency channel.

38. A base station according to claim 37, wherein the base station comprises means for transmitting said predetermined muting message simultaneously to several mobile stations situated within the coverage area of the base station utilizing the general transmission channel of the system.

39. A mobile station of a cellular radio system having base stations transmitting signals at different frequencies, said mobile station comprising:

transmitting means for transmitting radio signals, and receiving means for receiving radio signals, adjusting means, responsive to the receiving means, for the muting of the mobile station transmitting means in response to a transmitted predetermined muting message received by radio to prevent a user of the mobile station from communicating via the mobile station whilst it is muted;

detecting means for recognizing the base station of the system having the highest priority based upon the frequency of the signals received from the base stations; and control means, responding to the detecting means, for causing the adjusting means to adjust the transmitting output of the transmitting means in response to signals received from said recognized base station.

40. A mobile station according to claim 39, wherein the mobile station comprises:

means for monitoring signals transmitted on general transmission channels by at least two separate base stations;

and detecting means for the detecting of said muting message on any of said two general transmission channels.

41. A mobile station according to claim 39, wherein a first and a second base station serve between them radio cells belonging to different cellular radio systems and transmit on general transmission channels, and wherein the receiving means of the mobile station comprise means for receiving on the general transmission channels of two different cellular radio systems.

42. A mobile station according to claim 39, wherein said receiving means of the mobile station comprises means, responding to the detecting means, for locking on the channel used by said base station having the highest priority.

43. A mobile station according to claim 39 comprising a first receiver unit for receiving telecommunications signals and a second receiver for receiving the muting message.

44. A mobile station according to claim 39 comprising means for providing the capability of receiving the muting message on a frequency channel other than that used by the cellular radio system for telecommunications signals.

45. A mobile station according to claim 39 further comprising an alarm device and wherein said control means adjusts the sound level of said alarm device in response to signals received from said recognized base station.

* * * * *